A. A. PAULY.
MOLDING APPARATUS.
APPLICATION FILED NOV. 4, 1912. RENEWED NOV. 4, 1915.
1,253,991.
Patented Jan. 15, 1918.
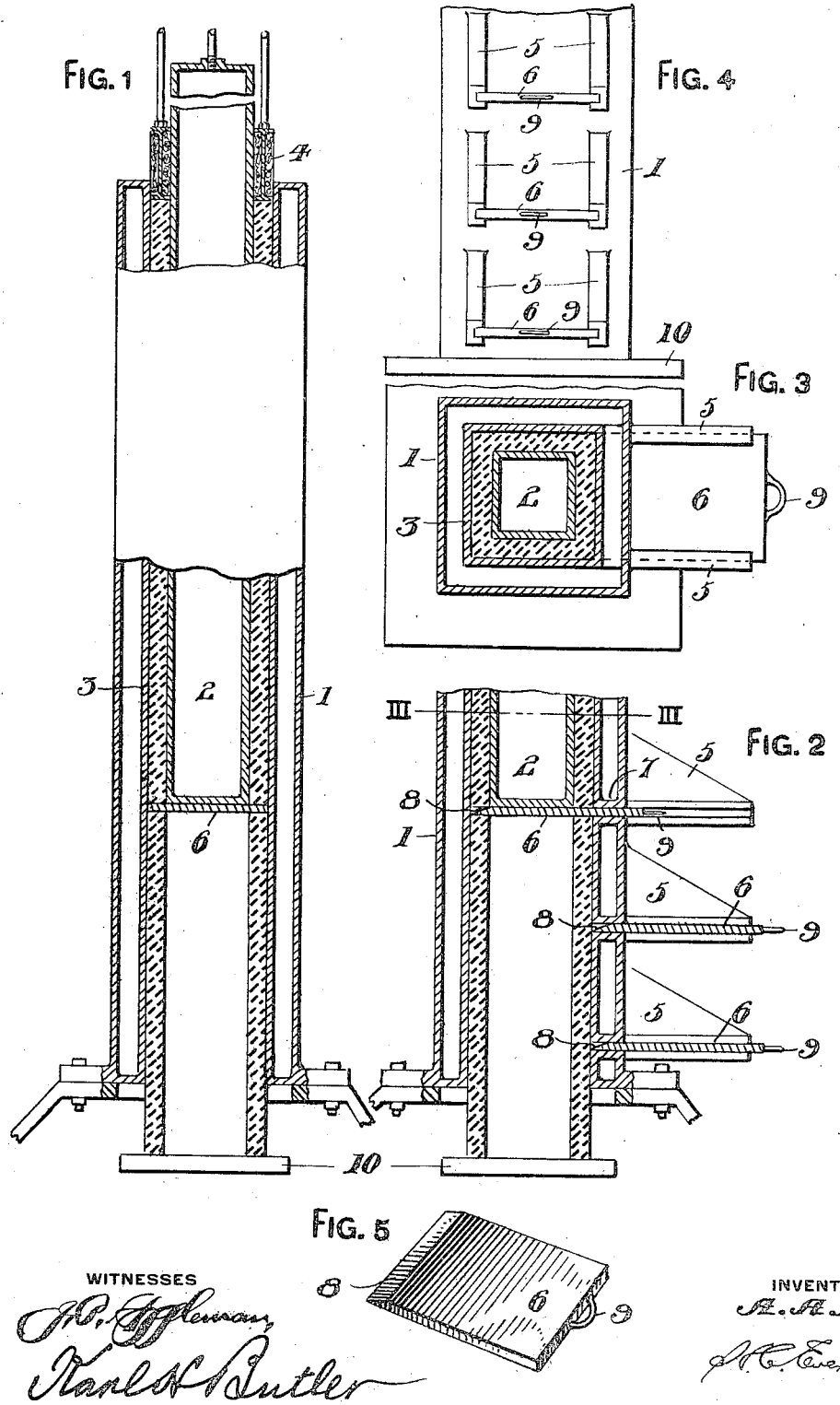

UNITED STATES PATENT OFFICE.

ALBERT A. PAULY, OF YOUNGSTOWN, OHIO.

MOLDING APPARATUS.

1,253,991.   Specification of Letters Patent.   Patented Jan. 15, 1918.

Application filed November 4, 1912, Serial No. 729,389.   Renewed November 4, 1915.   Serial No. 59,696.

*To all whom it may concern:*

Be it known that I, ALBERT A. PAULY, a citizen of the United States of America, residing at Youngstown, in the county of Mahoning and State of Ohio, have invented certain new and useful Improvements in Molding Apparatus, of which the following is a specification, reference being had therein to the accompanying drawing.

This invention relates to a molding apparatus, and has for its object the provision of a cutting off device, forming part of the mold form, whereby tiles or other molded articles can be obtained of a desired length or longitudinal dimension, the cutting off device also serving functionally as a support for a section of the cementitious material.

A further object of this invention is to provide a cutting off device for a molding apparatus that can be advantageously used in connection with the continuous production of molded cementitious articles, the device being inexpensive to install, durable and easy to operate.

My invention will be better understood when reference is had to the accompanying drawing, wherein, Figure 1 is a side elevation of a mold partly broken away and partly in section;

Fig. 2 is a vertical sectional view of the same, showing the cut-off device;

Fig. 3 is a horizontal sectional view of the same taken on the line III—III of Fig. 2, Fig. 4 is a front elevation of a portion of the mold; and Fig. 5 is a perspective view of a detached cut-off blade.

Referring to the drawings, the hollow-walled mold or form 1 has a hollow core 2 located therein and stationary relatively thereto, the core and mold being made hollow in order to permit the mold and core to be heated to expedite the setting of the cementitious material placed in the molding cavity 3. Slidable upon the core 2 is a plunger 4 adapted to enter the cavity 3 and compress the cementitious material therein and also force the molded articles from the mold, this plunger having provision whereby the confronting walls of the core and mold may be lubricated or greased to permit of the cementitious material readily passing through the molding cavity and avoid its adhering to the walls thereof.

The core 2 is wholly supported at one end of the mold and is of less length than the mold 1, whereby material molded in the cavity 3 can pass below the core 2 and out of the lower end of the mold, as clearly shown in Fig. 1. I provide the front side of the mold 1, at the lower end thereof, with superimposed sets of channel-shaped guide brackets 5 for cutting off blades 6. These blades extend through openings in partitions 7 connecting the walls of the mold 1, as shown in Fig. 2. The inner edges of the blades 6 are beveled, as at 8 and the outer edges thereof are provided with handles or connections 9 whereby said blades can be operated. The blades can be easily pushed into the mold, beneath the core, to sever that portion of the molded material that has been forced below the core by the plunger 4. It will be observed that the uppermost blade 8 moves across the end of the core 2 so that in severing the articles they will be supported inside and outside at the point of cutting and crumbling largely prevented. The blades may be used separately to cut the articles and by having a plurality of cut off devices, I am enabled to obtain sections of different lengths, and after a section has been removed upon a pallet 10, the section remaining in the mold is supported by the cut off blades, and may be subjected to pressure by the plunger 4.

In operating the apparatus the uppermost blade 8 is arranged to close the bottom of the molding space and the liquid cementitious material is poured into the top of the mold. On account of the heat supplied by the walls and core the material quickly solidifies and the blade may then be withdrawn and the molded article forced downwardly by the plunger which may also be used for subjecting the articles to pressure before the blade is removed. The articles may be cut into sections of the desired length by utilizing the appropriate one of the blades 8 and the sections may be delivered from the mold onto pallets 10.

What is claimed is:

The combination of a vertical form, a core arranged in said form and supported wholly at one end of the form, a plunger movable in the space between the form and core to force the molded articles out of the form and provided with means for lubricating the walls of said space, brackets on the exterior of said form having alined grooves in their adjacent sides, a cutting blade movable in said grooves across the end of said core to sever the molded articles into sections, the form and core coöperating to support the articles on the outside and inside at the point where the blade makes the cut, and said blade supporting one of the sections of the article after making a cut.

In testimony whereof I affix my signature in the presence of two witnesses.

ALBERT A. PAULY.

Witnesses:
H. G. BYE,
W. P. PRINDLE.